ROBERT THEMAR & BRAND BROTHERS.
Improvement in Sub-Soil Plows.

No. 115,543.  Patented May 30, 1871.

Witnesses:
Chas. Kenyon.
Edw.? Mase.

Inventor:
Robert Themar
Brandt Brothers,
Chipman, Hosmer & Co.
Attorneys.

115,543

UNITED STATES PATENT OFFICE.

ROBERT THEMAR AND BRAND BROTHERS, OF SHEBOYGAN, WISCONSIN.

IMPROVEMENT IN SUBSOIL-PLOWS.

Specification forming part of Letters Patent No. 115,543, dated May 30, 1871; antedated May 22, 1871.

*To all whom it may concern:*

Be it known that we, ROBERT THEMAR and BRAND BROTHERS, of Sheboygan, in the county of Sheboygan and State of Wisconsin, have invented a new and valuable Improvement in Subsoil-Plows; and we do hereby declare that the following is a full, clear, and exact description of the construction and operation of the same, reference being had to the annexed drawing making a part of this specification, and to the letters and figures of reference marked thereon.

Figure 1:
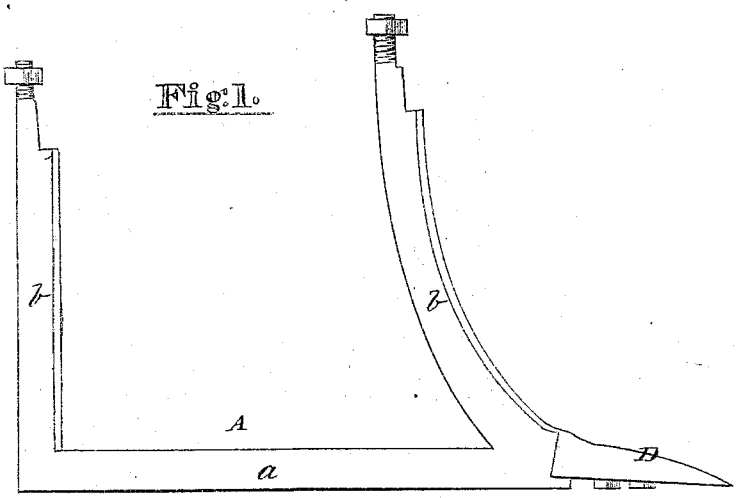
Figure 2:
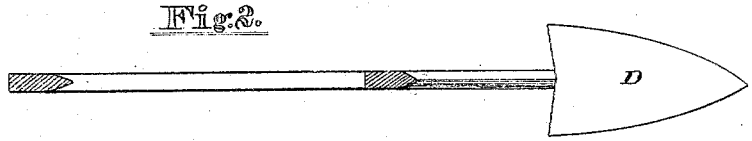
Figure 3:
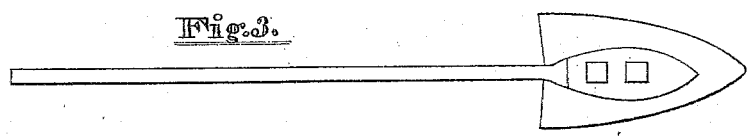
Figure 4:
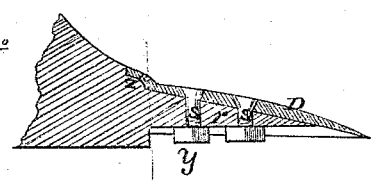
Figure 5:
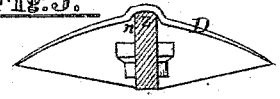

Figure 1 of the drawing is a side view of our invention. Fig. 2 is a horizontal section of the same. Figs. 3, 4, and 5 are details.

Our invention relates to an improvement in subsoil-plows; and consists in the formation of the convex steel point, and in the construction and novel arrangement of the connecting-stem, whereby it is adapted for subsoiling tenacious or clayey soil.

The letter A of the drawing designates the iron stem, consisting of the horizontal ground-bar $a$ and the uprights or arms $b$, whereby the bar $a$ is connected with the plow-beam. These arms $b$ have their forward edges made sharp in order that they may pass readily through the hard soil. D represents the convex point, formed of steel, and curved from side to side and from heel to point in such a manner as to stir and break the subsoil below the furrow. The point D is designed to break the soil for the full width of the furrow above, but without turning it over. The under surface of the point is concave, and fitted, by means of a recess, $n$, to a shoulder $z$, in the front portion of the horizontal bar $a$. The point D is secured to the projecting toe $r$ of the bar $a$ by means of the bolts and nuts $s\ s$.

It will be observed that the lower edge of the bar $a$ is in line with the forward end of the subsoiling point D, and serves to keep it steady and properly directed. It will also be observed that we form a recess, marked $y$, in the lower side of this bar $a$. This recess serves as a chamber to hold the nuts of the bolts by which the convex point is attached, and keep them from the ground.

Very little draft is required with this subsoil-plow in consequence of its form and the sharpened edges of the arms.

In consequence of the distance of the rear arm $b$ from the forward arm, its attachment to the plow-beam is very secure.

The whole attachment is very light and strong, and is designed to serve an excellent purpose in tenacious or clayey soils where subsoiling is difficult on account of the heavy draft, and yet most important.

What we claim as our invention, and desire to secure by Letters Patent, is—

The subsoil attachment herein described for plow and wheel cultivators, consisting of the ground-bar $a$, front and rear connecting-arms $b\ b$ with forward sharpened edges, recess $y$, and convex point D, when constructed and combined as and for the purpose specified, substantially as shown and described.

In testimony that we claim the above we have hereunto subscribed our names in the presence of two witnesses.

ROBERT THEMAR.
BRAND BROTHERS.

Witnesses:
BERNARD MEYER,
WILLIAM WÖSSMURM.